United States Patent
Xu et al.

(10) Patent No.: US 11,949,464 B1
(45) Date of Patent: Apr. 2, 2024

(54) DUAL-POLARIZATION-JOINT NOISE PROCESSING METHOD AND DEVICE

(71) Applicant: Shenzhen Research Institute of the Hong Kong Polytechnic University, Guangdong (CN)

(72) Inventors: Chuang Xu, Guangdong (CN); Pak Tao Lau, Guangdong (CN)

(73) Assignee: Shenzhen Research Institute of the Hong Kong Polytechnic University, Guangdong (CN)

( * ) Notice: Subject to any disclaimer, the term of this patent is extended or adjusted under 35 U.S.C. 154(b) by 0 days.

(21) Appl. No.: 18/074,999

(22) Filed: Dec. 5, 2022

(30) Foreign Application Priority Data

Oct. 12, 2022 (CN) .......................... 202211246659.6

(51) Int. Cl.
*H04B 17/345* (2015.01)
*H01Q 25/00* (2006.01)
*H04L 25/02* (2006.01)

(52) U.S. Cl.
CPC ....... *H04B 17/345* (2015.01); *H04L 25/0204* (2013.01); *H01Q 25/001* (2013.01)

(58) Field of Classification Search
CPC . H04B 17/345; H04L 25/0204; H01Q 25/001
See application file for complete search history.

(56) References Cited

U.S. PATENT DOCUMENTS

| | | | | |
|---|---|---|---|---|
| 2003/0204380 A1* | 10/2003 | Dishman | ................ | H04B 1/707 702/189 |
| 2014/0233949 A1* | 8/2014 | Chien | ................ | H04B 10/6166 398/65 |
| 2018/0227056 A1* | 8/2018 | Nakashima | ........ | H04B 10/6166 |

FOREIGN PATENT DOCUMENTS

CN          112865869 B          12/2021

OTHER PUBLICATIONS

T. Gui, T. H. Chan, C. Lu, A. P. T. Lau and P.-K. A. Wai, "Alternative Decoding Methods for Optical Communications Based on Nonlinear Fourier Transform," in *Journal of Lightwave Technology*, 1 May 1, 2017, pp. 1542-1550, vol. 35, No. 9, doi: 10.1109/JLT.2017. 2654493.

* cited by examiner

*Primary Examiner* — Sung S Ahn
(74) *Attorney, Agent, or Firm* — MUNCY, GEISSLER, OLDS & LOWE, P.C.

(57) ABSTRACT

The present application relates to a dual-polarization-joint noise processing method and device. The present application compensates the discrete spectral coefficient noise on the X polarization state with noise information carried by the discrete spectral eigenvalue on the X, Y polarization states, and a correlation coefficient between the discrete spectral eigenvalue and the discrete spectral coefficient on the X polarization state. Similarly, compensating the discrete spectral coefficient noise on the Y polarization state with noise information carried by the discrete spectral eigenvalue on the X, Y polarization states, and a correlation coefficient between the discrete spectral eigenvalue and the discrete spectral coefficient on the Y polarization state.

9 Claims, 3 Drawing Sheets

DUAL-POLARIZATION-JOINT NOISE PROCESSING METHOD AND DEVICE

CROSS-REFERENCE TO RELATED APPLICATIONS

The present application claims priority to Chinese patent application No. 202211246659.6, filed on Oct. 12, 2022, all of which are referenced herein.

FIELD OF THE DISCLOSURE

The present application relates to the technical field of noise processing, in particular to a noise processing method and a noise processing device for signal based on dual-polarization combination.

BACKGROUND

Optical fiber is suitable for communication of large capacity and long distance. However, the optical fiber can also generate nonlinear noise which reduces the signal quality of the optical fiber communication. In order to overcome the noise impact generated by the nonlinear effect of the optical fiber on signal, algorithms based on machine learning have been investigated in the prior art to remove the nonlinear noise in the signals. On the one hand, machine learning algorithms are time-consuming due to high algorithm complexity, on the other hand, machine learning denoises an unknown signal based on studying the known historical signals, thus it is hard to be generalized to an arbitrary unknown signal accurately.

Thus, the noise processing method for signal in the prior art has relatively poor denoising effectiveness.

Therefore, current technologies need to be improved.

BRIEF SUMMARY OF THE DISCLOSURE

To address the defects in the prior art described above, the present application aims to provide a dual-polarization-joint noise processing method and device, in order to solve the problem in the prior art that the noise processing method for signal has relatively poor denoising effectiveness.

The technical solution of the present application to solve the technical problems is as follows:

On the first aspect, the application provides a dual-polarization-joint noise processing method which comprises:

calculating an X noise correlation coefficient on an X polarization state and a Y noise correlation coefficient on a Y polarization state respectively, the X noise correlation coefficient is configured to characterize a correlation between a training eigenvalue noise of a training discrete spectral eigenvalue and an X training discrete spectral coefficient noise of an X training discrete spectral coefficient on the X polarization state; the Y noise correlation coefficient is configured to characterize a correlation between the training eigenvalue noise and a Y training discrete spectral coefficient noise of a Y training discrete spectral coefficient on the Y polarization state; the training discrete spectral eigenvalue and the training discrete spectral coefficient are two properties of a training nonlinear frequency division multiplexing signal in a nonlinear frequency domain; the X polarization state and the Y polarization state are two polarization states of the training nonlinear frequency division multiplexing signal in a time domain;

obtaining an X non-training discrete spectral coefficient noise from the X discrete spectral coefficient of the X polarization state and a Y non-training discrete spectral coefficient noise from a Y discrete spectral coefficient of the Y polarization state based on a non-training eigenvalue noise of a non-training discrete spectral eigenvalue, the X noise correlation coefficient, and the Y noise correlation coefficient; the non-training discrete spectral eigenvalue, the X non-training discrete spectral coefficient, and the Y non-training discrete spectral coefficient are three properties of a non-training nonlinear frequency division multiplexing signal in the nonlinear frequency domain;

obtaining an X non-training discrete spectral coefficient after a noise compensation process and a Y non-training discrete spectral coefficient after the noise compensation process, according to the X non-training discrete spectral coefficient noise, the Y non-training discrete spectral coefficient noise, the X non-training discrete spectral coefficient, and the Y non-training discrete spectral coefficient; the noise compensation is configured to characterize denoising information.

In another embodiment, the step of calculating the X noise correlation coefficient on the X polarization state and the Y noise correlation coefficient on the Y polarization state respectively, the X noise correlation coefficient is configured to characterize the correlation between the training eigenvalue noise of the training discrete spectral eigenvalue and the X training discrete spectral coefficient noise of the X training discrete spectral coefficient on the X polarization state; the Y noise correlation coefficient is configured to characterize a correlation between the training eigenvalue noise and a Y training discrete spectral coefficient noise of a Y training discrete spectral coefficient on the Y polarization state; the training discrete spectral eigenvalue and the training discrete spectral coefficient are two properties of the training nonlinear frequency division multiplexing signal in the nonlinear frequency domain; the X polarization state and the Y polarization state are two polarization states of the training nonlinear frequency division multiplexing signal in the time domain, comprises:

obtaining an X training eigenvalue noise and a Y training eigenvalue noise in the training eigenvalue noises, according to the training eigenvalue noise; the X training eigenvalue noise is configured to characterize a noise contained in the training discrete spectral eigenvalue located on the X polarization state; the Y training eigenvalue noise is configured to characterize a noise contained in the training discrete spectral eigenvalue located on the Y polarization state;

circularly shifting the X training eigenvalue noise and the Y training eigenvalue noise by K positions respectively (K is an integer) according to a set timing sequence, and obtaining the X training eigenvalue noise and the Y training eigenvalue noise after the shift respectively;

constructing a training noise matrix according to an arrangement order of the X training eigenvalue noise, the X training eigenvalue noise after the shift, the Y training eigenvalue noise, and the Y training eigenvalue noise after the shift;

obtaining the X noise correlation coefficient and the Y noise correlation coefficient, according to the training noise matrix, the X training discrete spectral coefficient noise, and the Y training discrete spectral coefficient noise.

In another embodiment, the step of obtaining the X noise correlation coefficient and the Y noise correlation coefficient according to the training noise matrix, the X training discrete spectral coefficient noise, and the Y training discrete spectral coefficient noise, comprises:

obtaining an "X multiplication" vector by multiplying the training noise matrix by an X setting parameter matrix; the X setting parameter matrices comprise the X noise correlation coefficients;

determining the X setting parameter matrices such that the mean square error between the X training discrete spectral coefficient noise and the "X multiplication" vector is minimized;

obtaining the X noise correlation coefficient according to the value of each element in the X setting parameter matrices;

obtaining a "Y multiplication" vector by multiplying the training noise matrix by a Y setting parameter matrix; the Y setting parameter matrices comprise the Y noise correlation coefficients;

determining the Y setting parameter matrices such that the mean square error between the Y training discrete spectral coefficient noise and the "Y multiplication" vector is minimized;

obtaining the Y noise correlation coefficient according to the value of each element in the Y setting parameter matrices.

In another embodiment, the step of obtaining the X non-training discrete spectral coefficient noise contained in the X non-training discrete spectral coefficient on the X polarization state and the Y non-training discrete spectral coefficient noise contained in the Y non-training discrete spectral coefficient on the Y polarization state according to the non-training eigenvalue noise of the non-training discrete spectral eigenvalue, the X noise correlation coefficient, and the Y noise correlation coefficient, comprises:

obtaining the X non-training eigenvalue noise on the X polarization state and the Y non-training eigenvalue noise on the Y polarization state in the non-training eigenvalue noise, according to the non-training eigenvalue noise;

multiplying the X non-training eigenvalue noise by the X noise correlation coefficient, and obtaining the X non-training discrete spectral coefficient noise;

multiplying the Y non-training eigenvalue noise by the Y noise correlation coefficient, and obtaining the Y non-training discrete spectral coefficient noise.

In another embodiment, the step of obtaining the X non-training discrete spectral coefficient after the noise compensation and the Y non-training discrete spectral coefficient after the noise compensation, according to the X non-training discrete spectral coefficient noise and the Y non-training discrete spectral coefficient noise as well as the X non-training discrete spectral coefficient and the Y non-training discrete spectral coefficient; the noise compensation is configured to characterize the denoising information, comprises:

subtracting the X non-training discrete spectral coefficient noise from the X non-training discrete spectral coefficient, and obtaining the X non-training discrete spectral coefficient after the noise compensation;

subtracting the Y non-training discrete spectral coefficient noise from the Y non-training discrete spectral coefficient, and obtaining the Y non-training discrete spectral coefficient after the noise compensation.

In another embodiment, the nonlinear frequency division multiplexing signal in the nonlinear frequency domain is a nonlinear frequency division multiplexing signal in the nonlinear frequency domain at a receiver, and a generation method of the nonlinear frequency division multiplexing signal in the nonlinear frequency domain at the receiver comprises:

controlling a transmitter to generate two streams of the nonlinear frequency division multiplexing signal in the nonlinear frequency domain;

controlling the transmitter to perform an inverse nonlinear Fourier transform on the two streams of the nonlinear frequency division multiplexing signal in the nonlinear frequency domain, and obtaining two streams of non-linear frequency division multiplexing signal in the time domain;

controlling the transmitter to load respectively the two streams of the nonlinear frequency division multiplexing signal in the time domain to the X polarization state and the Y polarization state of an optical signal modulator, and obtaining the nonlinear frequency division multiplexing signal in the time domain on the X polarization state and the nonlinear frequency division multiplexing signal in the time domain on the Y polarization state;

controlling the transmitter to transmit the nonlinear frequency division multiplexing signal in the time domain on the X polarization state and the nonlinear frequency division multiplexing signal in the time domain on the Y polarization state along an optical fiber to the receiver, configured to generate the nonlinear frequency division multiplexing signal in the nonlinear frequency domain at the receiver.

In another embodiment, the step of controlling the transmitter to transmit the nonlinear frequency division multiplexing signal in the time domain on the X polarization state and the nonlinear frequency division multiplexing signal in the time domain on the Y polarization state along an optical fiber to the receiver, configured to generate the nonlinear frequency division multiplexing signal in the nonlinear frequency domain at the receiver, comprises:

controlling the transmitter to transmit the nonlinear frequency division multiplexing signal in the time domain on the X polarization state and the nonlinear frequency division multiplexing signal in the time domain on the Y polarization state alternately to the receiver along the optical fiber, a symbol number of the nonlinear frequency division multiplexing signal in the time domain on the X polarization state is equal to a symbol number of the nonlinear frequency division multiplexing signal in the time domain on the Y polarization state.

On the second aspect, the present application further provides a dual-polarization-joint noise processing device, which comprises the following components:

a noise correlation coefficient calculation module, configured to calculate the X noise correlation coefficient on the X polarization state and the Y noise correlation coefficient on the Y polarization state respectively, the X noise correlation coefficient is configured to characterize the correlation between the training eigenvalue noise of the training discrete spectral eigenvalue and the X training discrete spectral coefficient noise of the X training discrete spectral coefficient on the X polarization state; the Y noise correlation coefficient is configured to characterize the correlation between the training eigenvalue noise and the Y training discrete spectral coefficient noise of the Y training discrete spectral coefficient on the Y polarization state; the training discrete spectral eigenvalue and the training discrete spectral coefficient are two properties of the training nonlinear frequency division multiplexing signal in the nonlinear frequency domain; the X polarization state and the Y polarization state are two polarization states of the training nonlinear frequency division multiplexing signal in the time domain;

a noise calculation module, configured to obtain the X non-training discrete spectral coefficient noise contained in the X non-training discrete spectral coefficient on the X polarization state and the Y non-training discrete spectral coefficient noise contained in the Y non-training discrete spectral coefficient on the Y polarization state based on the non-training eigenvalue noise of the non-training discrete spectral eigenvalue, the X noise correlation coefficient, and the Y noise correlation coefficient; the non-training discrete spectral eigenvalue, the X non-training discrete spectral coefficient, and the Y non-training discrete spectral coefficient are three properties of the non-training nonlinear frequency division multiplexing signal in the nonlinear frequency domain;

a noise compensation module, configured to obtain the X non-training discrete spectral coefficient after the noise compensation and the Y non-training discrete spectral coefficient after the noise compensation, according to the X non-training discrete spectral coefficient noise and the Y non-training discrete spectral coefficient noise as well as the X non-training discrete spectral coefficient and the Y non-training discrete spectral coefficient; the noise compensation is configured to characterize the denoising information.

On the third aspect, the present application further provides a terminal device, which comprises a computer-readable storage medium, a processor, and a dual-polarization-joint noise processing program stored in the computer-readable storage medium and being able to be run by the processor. When the processor runs the dual-polarization-joint noise processing program, the steps of the dual-polarization-joint noise processing method described thereinbefore are conducted.

On the fourth aspect, the present application further provides a computer-readable storage medium, the computer-readable storage medium has the dual-polarization-joint noise processing program stored, when the dual-polarization-joint noise processing program is run by the processor, the steps of the noise processing method described thereinbefore are conducted.

Benefits: transmitting the nonlinear frequency division multiplexing signal in the nonlinear frequency domain in an optical fiber channel will generate a noise, and the noise generated will change the discrete spectral eigenvalue and a discrete spectral coefficient of the nonlinear frequency division multiplexing signal in the nonlinear frequency domain, that is, making both the discrete spectral eigenvalue and the discrete spectral coefficient carry with noise, and there is a correlation between the noise carried by both, further since the noise carried by the eigenvalue of the discrete spectrum is often known, thus it is possible to apply the noise carried by the eigenvalue of the discrete spectrum to calculating the noise contained in the discrete spectral coefficient. The present application supplements the discrete spectral coefficient noise on the X polarization state with noise information carried in the discrete spectral eigenvalue (an eigenvalue noise) and the X noise correlation coefficient between the discrete eigenvalue and the discrete spectral coefficient on the X polarization state, also supplements the discrete spectral coefficient noise on the Y polarization state with the noise information carried in the discrete spectral eigenvalue and the Y noise correlation coefficient between the discrete eigenvalue and the discrete spectral coefficient on the Y polarization state. Since when compensating the discrete spectral coefficient noise on the X polarization state and the Y polarization state, the present application makes use of the eigenvalue noise on the X polarization state and the Y polarization state, and introduces more known noise information, thus it realizes the compensation of the discrete spectral coefficient noise on the X polarization state and the Y polarization state better, that is, improves the quality of the signal carried by the discrete spectral coefficient. In addition, the presented application divides the discrete spectral coefficients into the X polarization state and the Y polarization state, to compensate for the noise of both respectively, so as to further improve a signal quality carried by the discrete spectral coefficient after the noise compensation.

DETAILED DESCRIPTION OF EMBODIMENTS

Figure 1:
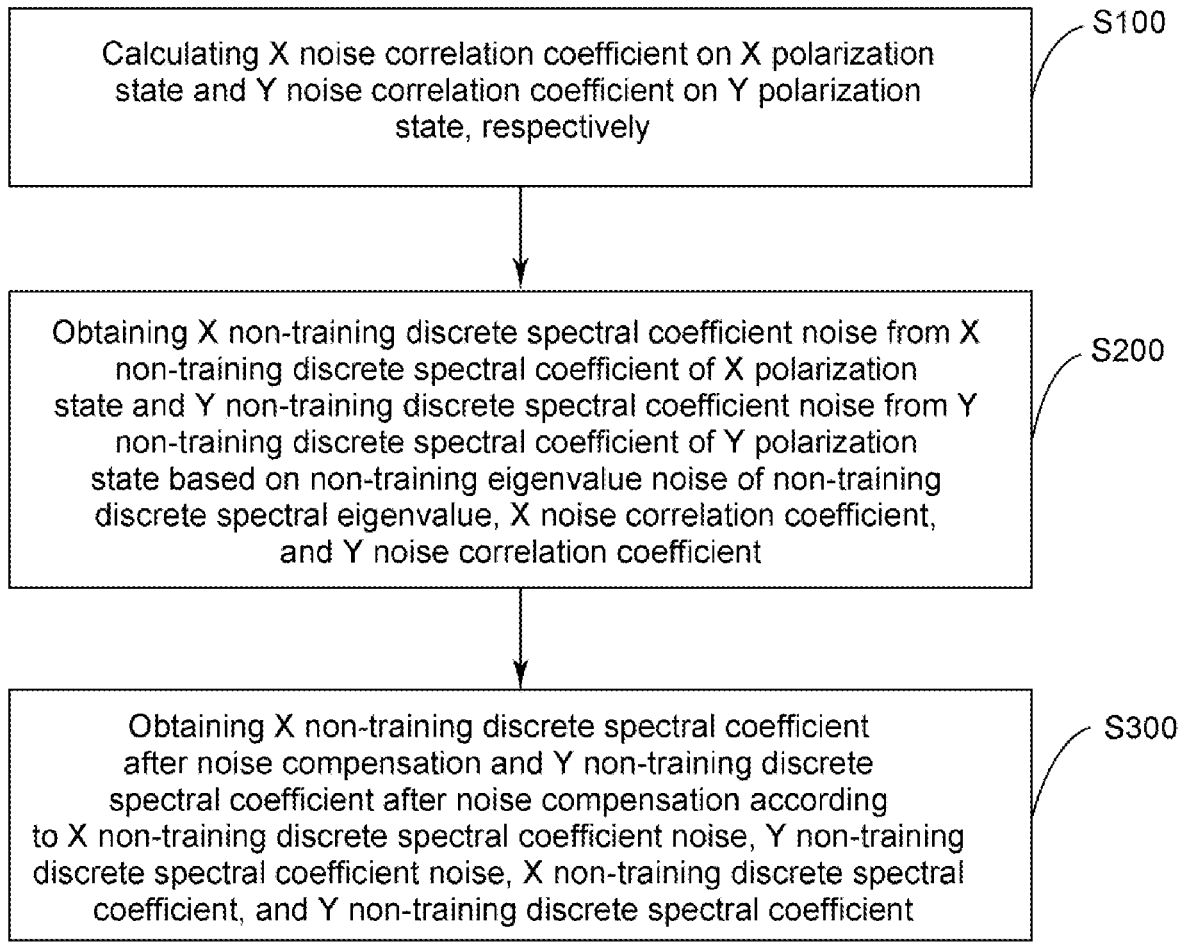
FIG. 1 is a flow chart of the present application.

To make the technical solution of the present application more explicit, further detailed descriptions of the present application are stated herein, referencing to the attached drawings and embodiments of the present application. It should be understood that other embodiments derived from the present application without creative effort for those skilled in the art should be considered to be within the scope of the present application.

Optical fiber is suitable for large-capacity and long-distance communication. However, the optical fiber can also generate a nonlinear noise, which reduces the communication quality. In order to overcome the noise impact generated by the nonlinear effect of the optical fiber on signal, an algorithm based on machine learning is adopted in the prior art to remove the nonlinear noise in the signals. On the one hand, machine learning algorithms are time-consuming due to the algorithm complexity; on the other hand, machine learning denoises an unknown signal based on studying the known historical signals, thus it is hard to be generalized to every unknown signal accurately.

In order to solve the technical problems stated above, the present application provides a dual-polarization-joint noise processing method and device, which solves the problem that the noise processing method for signal in the prior art has poor denoising performance. In an implementation, first calculating an X noise correlation coefficient on an X polarization state and a Y noise correlation coefficient on a Y polarization state, followed by obtaining an X non-training discrete spectral coefficient noise contained in an X non-training discrete spectral coefficient on the X polarization state and a Y non-training discrete spectral coefficient noise contained in a Y non-training discrete spectral coefficient on the Y polarization state, based on a non-training eigenvalue noise of a non-training discrete spectral eigenvalue, the X noise correlation coefficient, and the Y noise correlation coefficient, and finally obtaining an X non-training discrete spectral coefficient after a noise compensation and a Y non-training discrete spectral coefficient after the noise compensation, according to the X non-training discrete spectral coefficient noise and the Y non-training discrete spectral coefficient noise as well as the X non-training discrete spectral coefficient and the Y non-training discrete spectral coefficient.

In an embodiment, a transmitter generates a nonlinear frequency division multiplexing signal in the nonlinear frequency domain (an NFDM signal in the nonlinear frequency domain), and the transmitter converts the NFDM signal from the nonlinear frequency domain into a nonlinear frequency division multiplexing signal in the time domain (an NFDM signal in the time domain) by INFT (inverse nonlinear Fourier transform), followed by the transmitter loading the NFDM signal in the time domain onto an X polarization state and a Y polarization state of an optical signal modulator, and the NFDM signal in the time domain on the X polarization state and the Y polarization state is transmitted along an optical fiber to a receiver. The receiver performs NFT (nonlinear Fourier transform) on the NFDM signal in the time domain on the X polarization state and the Y polarization state to obtain the NFDM signal in the nonlinear frequency domain. The NFDM signal in the nonlinear frequency domain comprises a discrete spectral eigenvalue and a discrete spectral coefficient, wherein the discrete spectral coefficient carries the information of the NFDM signal in the nonlinear frequency domain, thus it is necessary to carry out a noise compensation for the discrete spectral coefficient (the noise compensation is removing the noise generated by the optical fiber when transmitting the NFDM signal in the time domain). In the present embodiment, an NFDM signal in the time domain to be transmitted is designed so that an eigenvalue $\lambda$ of the NFDM signal in the time domain is unchanged. That is, as long as a discrete spectral eigenvalue $\lambda'$ of the NFDM signal in the nonlinear frequency domain at the receiver is known, the difference information between the $\lambda'$ and the $\lambda$ is noise information generated during the discrete spectral eigenvalue being transmitted in the optical fiber. Since there is a correlation between noise information generated on the discrete spectral eigenvalue and noise information generated on the discrete spectral coefficient, thus as long as knowing the noise information generated on the discrete spectral eigenvalue, it is possible to know the noise contained in the discrete spectral coefficient on the X polarization state and the noise contained in the discrete spectral coefficient on the Y polarization state. By subtracting the noise of the discrete spectral coefficient from the discrete spectral coefficient, it is possible to restore approximately the discrete spectral coefficient of the NFDM signal in the nonlinear frequency domain, that is, the noise compensation for the discrete spectral coefficient is realized.

Embodiments

The noise processing method for the signal based on the dual-polarization combination in the present embodiment can be applied to a terminal device, the terminal device may be a terminal product having a computing function, including a computer and more. In the present embodiment, as shown in FIG. 1, the noise processing method for the signal based on the dual-polarization combination comprises the following steps:

S100, calculating an X noise correlation coefficient on an X polarization state and a Y noise correlation coefficient on a Y polarization state respectively, the X noise correlation coefficient is configured to characterize a correlation between a training eigenvalue noise of a training discrete spectral eigenvalue and an X training discrete spectral coefficient noise of an X training discrete spectral coefficient on the X polarization state; the Y noise correlation coefficient is configured to characterize a correlation between the training eigenvalue noise and a Y training discrete spectral coefficient noise of a Y training discrete spectral coefficient on the Y polarization state; the training discrete spectral eigenvalue and the training discrete spectral coefficient are two properties of a training nonlinear frequency division multiplexing signal in a frequency domain; the X polarization state and the Y polarization state are two polarization states of the training nonlinear frequency division multiplexing signal in a time domain.

The present embodiment first transmits an NFDM signal as a training signal between a transmitter, an optical fiber and a receiver. That is, the NFDM signal at the receiver is known, that is, its discrete spectral eigenvalue $\lambda$ and discrete spectral coefficient b of the NFDM signal at the receiver are known. When the NFDM signal reaches the receiver, a discrete spectral eigenvalue $\lambda'$ and a discrete spectral coefficient b' of the NFDM signal at the receiver are analyzed, and a difference value $\Delta\lambda$ between the $\lambda'$ and the $\lambda$ is calculated (which represents how much noise is generated when $\lambda$ is transmitted through the optical fiber), as well as a difference value (discrete spectral coefficient noise $\Delta b$) between the b' and the b is calculated (which represents how much noise is generated when b is transmitted through the optical fiber). Followed by calculating the correlation between the $\Delta\lambda$ and the $\Delta b$ (obtaining a noise correlation coefficient vector c). The present embodiment, when calculating the noise correlation coefficient on each polarization state, applies the eigenvalue noise $\Delta\lambda$ on both polarization states, so as to utilize more noise information, and improve the accuracy of a noise correlation coefficient c finally calculated.

Figure 2:
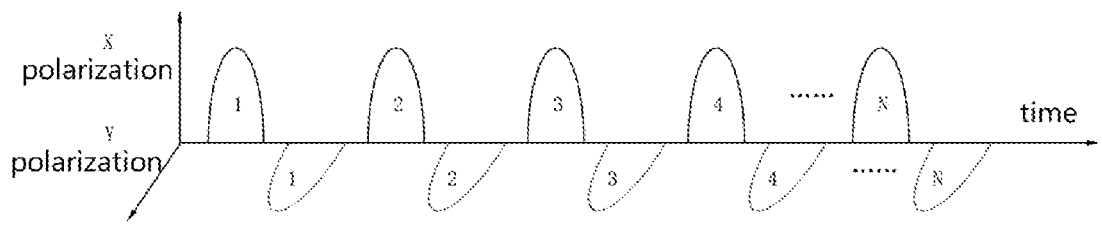
FIG. 2 illustrates an interleaving arrangement schematic in the time domain of the signal pulse sequence in X polarization state and Y polarization state at a transmitter in an embodiment of the present application.

A detailed process of transmitting the NFDM by the transmitter and receiving the NFDM by the receiver is as follows: the transmitter generates two streams of the nonlinear frequency division multiplexing signal in the nonlinear frequency domain (the NFDM signal in the nonlinear frequency domain), then the transmitter performs inverse nonlinear Fourier transform (INFT) on each of the two streams of the nonlinear frequency division multiplexing signal in the nonlinear frequency domain respectively, and obtains two streams of a nonlinear frequency division multiplexing signal in the time domain (an NFDM signal in the time domain), followed by controlling the transmitter to load the two streams of the nonlinear frequency division multiplexing signal in the time domain onto an X polarization state and a Y polarization state of an optical signal modulator, thus obtaining the nonlinear frequency division multiplexing signal in the time domain on the X polarization state and the nonlinear frequency division multiplexing signal in the time domain on the Y polarization state respectively; and controlling the transmitter to transmit the nonlinear frequency division multiplexing signal in the time domain on the X polarization state and the nonlinear frequency division multiplexing signal in the time domain on the Y polarization state along the optical fiber to the receiver in an alternate manner as shown in FIG. 2. The receiver receives the NFDM signal in the time domain on the X polarization state and the NFDM signal in the time domain on the Y polarization state, and performs NFT to obtain the NFDM signal in the nonlinear frequency domain on both polarization states.

The principle that the transmitter transmits the NFDM and the receiver receives the NFDM is as follows:

The transmitter generates two streams of NFDM signal flow in the nonlinear frequency domain carrying independent information, which are converted into two streams of signal flow in the time domain by an INFT, followed by loading onto the X polarization state and the Y polarization state of the optical signal modulator respectively, which are exactly staggered from each other in the time domain. After being transmitted by the optical fiber, the signal at the receiver will be distorted and the signal-to-noise ratio will be reduced. Receiving the NFDM signal flow in the time domain on the X polarization state and the Y polarization state at the receiver, and performing an NFT on each of them respectively, to obtain an NFDM signal in the nonlinear frequency domain with a noise. Next, performing a joint LMMSE calculation on the X polarization state and the Y polarization state as well as a noise compensation, to obtain a noise compensation discrete spectral coefficient, so as to reduce the noise and improve the quality of the NFDM signal.

The NFDM signal flow in the time domain in the present embodiment is a pulse sequence composed of pulse 1, pulse 2, pulse 3, . . . , pulse N as shown in FIG. 2.

The present embodiment, by transmitting the NFDM signal in the time domain alternately on the X polarization state and the Y polarization state, is able to reduce an interference between the signal on the X polarization state and the signal on the Y polarization state, as well as improving a signal to noise ratio at the receiver.

After receiving the NFDM signal flow in the time domain and transforming it into the NFDM signal flow in the nonlinear frequency domain, the receiver will perform the step S100, which comprises steps S101 to S109 as follows:

S101, obtaining the X training eigenvalue noise and Y training eigenvalue noise in the training eigenvalue noise, according to the training eigenvalue noise; the X training eigenvalue noise is configured to characterize a noise contained in the training discrete spectral eigenvalue located on the X polarization state; the Y training eigenvalue noise is configured to characterize a noise contained in the training discrete spectral eigenvalue located on the Y polarization state.

During training, the receiver is able to obtain a discrete spectral eigenvalue $\lambda_i^X$ on the X polarization state and a discrete spectral eigenvalue $\lambda_i^Y$ on the Y polarization state, by performing NFT to an i-th NFDM signal in the time domain on the X polarization state and on the Y polarization state respectively, the discrete spectral eigenvalue $\lambda_i^X$ minus a discrete spectral eigenvalue $\lambda_i'^X$ on the X polarization state transmitted by the transmitter is the noise $\Delta\lambda_i^X$ (an X training eigenvalue noise) generated when the i-th NFDM signal in the time domain transmitted by the transmitter arrives at the receiver. By adopting the same method, a Y training eigenvalue noise $\Delta\lambda_i^Y$ is calculated. The $\Delta\lambda_i^X$ is divided into its real part $Re\{\Delta\lambda_i^X\}$ and imaginary part $Im\{\Delta\lambda_i^X\}$, and $\Delta\lambda_i^Y$ is divided into its real part $Re\{\Delta\lambda_i^Y\}$ and imaginary part $Im\{\Delta\lambda_i^Y\}$.

S102, circularly shifting the X training eigenvalue noise and the Y training eigenvalue noise by K positions respectively (K is an integer) according to a set timing sequence, and obtaining the X training eigenvalue noise and the Y training eigenvalue noise after the shift respectively.

The transmitter transmits pulses on the X polarization state and pulses on the Y polarization state alternately in a way shown in FIG. 2, and the receiver receives the pulse on the X polarization state and the pulse on the Y polarization state alternately in the same way. As shown in FIG. 2, the receiver receives the first pulse, the second pulse, . . . , the m-th pulse successively on the X polarization state. Performing NFT on the m NFDM pulses respectively to obtain m-element X training eigenvalue noise two vectors $Re\ \Delta\lambda^X$: $Re\ \Delta\lambda^X = Re\{[\Delta\lambda_1^X, \Delta\lambda_2^X, \ldots, \Delta\lambda_m^X]^T\}$, and $Im\ \Delta\lambda^X$: $Im\ \Delta\lambda^X = Im\{[\Delta\lambda_1^X, \Delta\lambda_2^X, \ldots, \Delta\lambda_m^X]^T\}$. In the same way, for the Y polarization state, obtaining the eigenvalue noise vectors $Re\ \Delta\lambda^Y$: $Re\ \Delta\lambda^Y = Re\{[\Delta\lambda_1^Y, \Delta\lambda_2^Y, \ldots, \Delta\lambda_m^Y]^T\}$, and $Im\ \Delta\lambda^Y$: $Im\ \Delta\lambda^Y = Im\{[\Delta\lambda_1^Y, \Delta\lambda_2^Y, \ldots, \Delta\lambda_m^Y]^T\}$.

Circularly shifting the X training eigenvalue noise and the Y training eigenvalue noise by the same positions respectively aims to calculate the correlation between the discrete spectral eigenvalue noises of the preceding symbol/following symbol and the discrete spectral coefficient noise of the current symbol. In other words, for a current symbol, it is possible to estimate the discrete spectral coefficient noise of the current symbol by using the discrete spectral eigenvalue noises of the preceding symbol, the current symbol itself, and the following symbol together, so as to improve the estimation accuracy. The present embodiment circularly shifts one position to the left and one position to the right respectively, and the $Re\ \Delta\lambda^X$ circularly shifted one position to the left is denoted by $Re\ \Delta\lambda^{X+1}$: $Re\ \Delta\lambda^{X+1} = Re\{[\Delta\lambda_2^X, \Delta\lambda_3^X, \ldots, \Delta\lambda_m^X, \Delta\lambda_1^X]^T\}$, the $Re\ \Delta\lambda^X$ circularly shifted one position to the right is denoted by $Re\ \Delta\lambda^{X-1}$: $Re\ \Delta\lambda^{X-1} = Re\{[\Delta\lambda_m^X, \Delta\lambda_1^X, \Delta\lambda_2^X, \ldots, \Delta\lambda_{m-1}^X]^T\}$. Similarly, $Im\ \Delta\lambda^{X+1}$, $Im\ \Delta\lambda^{X-1}$, $Re\ \Delta\lambda^{Y+1}$, $Re\ \Delta\lambda^{Y-1}$, $Im\ \Delta\lambda^{Y+1}$, $Im\ \Delta\lambda^{Y-1}$ can be obtained.

The receiver receives the training NFDM signal in the time domain and performs NFT on the signal to get the discrete spectral coefficient. A difference between the discrete spectral coefficient at the receiver and the discrete spectral coefficient at the transmitter is the training discrete spectral coefficient noise $\Delta b$. The training discrete spectral coefficient noise on X polarization state and Y polarization state are denoted by $\Delta b^X$ and $\Delta b^Y$, respectively, which are then divided respectively into amplitude parts $\Delta|b|^X$ and $\Delta|b|^Y$, and phase parts $\Delta\angle b^X$ and $\Delta\angle b^Y$.

$$\Delta|b|^X = [\Delta|b|_1^X, \Delta|b|_2^X, \ldots, \Delta|b|_m^X]^T$$

$$\Delta|b|^Y = [\Delta|b|_1^Y, \Delta|b|_2^Y, \ldots, \Delta|b|_m^Y]^T$$

$$\Delta\angle b^X = [\Delta\angle b_1^X, \Delta\angle b_2^X, \ldots, \Delta\angle b_m^X]^T$$

$$\Delta\angle b^Y = [\Delta\angle b_1^Y, \Delta\angle b_2^Y, \ldots, \Delta\angle b_m^Y]^T$$

S103, constructing a training noise matrix A according to the arrangement order of the X training eigenvalue noise, the X training eigenvalue noise after circular shift, the Y training eigenvalue noise, and the Y training eigenvalue noise after circular shift.

$$A = \begin{bmatrix} | & | & | & | & | & | & | & | & | & | & | & | \\ Re\Delta\lambda^X & Re\Delta\lambda^{X+1} & Re\Delta\lambda^{X-1} & Im\Delta\lambda^X & Im\Delta\lambda^{X+1} & Im\Delta\lambda^{X-1} & Re\Delta\lambda^Y & Re\Delta\lambda^{Y+1} & Re\Delta\lambda^{Y-1} & Im\Delta\lambda^Y & Im\Delta\lambda^{Y+1} & Im\Delta\lambda^{Y-1} \\ | & | & | & | & | & | & | & | & | & | & | & | \end{bmatrix}$$

Wherein | denotes a column vector form.

S104, multiplying the training noise matrix by X setting parameter matrices:

$$\begin{bmatrix} | & | \\ & c_a^X & \\ | & | \end{bmatrix}$$

and $$\begin{bmatrix} | & | \\ & c_p^X & \\ | & | \end{bmatrix},$$

and obtaining an "X multiplication" vector, the X setting parameter matrices are composed of the X noise correlation coefficients;

S105, determining the X setting parameter matrices such that the mean square error between the X training discrete spectral coefficient noise and the "X multiplication" vector is minimized;

S106, obtaining the X noise correlation coefficient according to the value of each element in the X setting parameter matrices;

steps S104 to S106 are to find the X noise correlation coefficient by constructing two following formulas:

$$\begin{bmatrix} | & | \\ \Delta|b|^X & \\ | & | \end{bmatrix} \cong A \begin{bmatrix} | & | \\ & c_a^X & \\ | & | \end{bmatrix} \quad (1)$$

$$\begin{bmatrix} | & | \\ \Delta\angle b^X & \\ | & | \end{bmatrix} \cong A \begin{bmatrix} | & | \\ & c_p^X & \\ | & | \end{bmatrix} \quad (2)$$

$\cong$ represents to minimize the mean square error, and the meaning of the formula 1 is that each element in the $$\begin{bmatrix} | & | \\ & c_a^X & \\ | & | \end{bmatrix}$$

is the X noise correlation coefficient between the eigenvalue noise on the X polarization state and a coefficient amplitude noise on the X polarization state when the mean square error between the left-hand side and right-hand side is minimized (the right-hand side is the "X multiplication" vector);

the meaning of formula 2 is that each element in the $$\begin{bmatrix} | & | \\ & c_p^X & \\ | & | \end{bmatrix}$$

is the X noise correlation coefficient between the eigenvalue noise on the X polarization state and the coefficient phase noise on the X polarization state when the mean square error between the left-hand side and right-hand side is minimized.

S107, multiplying the training noise matrix by Y setting parameter matrices:

$$\begin{bmatrix} | & | \\ & c_a^Y & \\ | & | \end{bmatrix}$$

and $$\begin{bmatrix} | & | \\ & c_p^Y & \\ | & | \end{bmatrix},$$

and obtaining a "Y multiplication" vector, the Y setting parameter matrices are composed of the Y noise correlation coefficients;

S108; determining the Y setting parameter matrices such that the mean square error between the Y training discrete spectral coefficient noise and the "Y multiplication" vector is minimized.

S109, obtaining the Y noise correlation coefficient according to the value of each element in the Y setting parameter matrices;

steps S107 to S109 are to find the Y noise correlation coefficient by constructing two following formulators:

$$\begin{bmatrix} | & | \\ \Delta|b|^Y & \\ | & | \end{bmatrix} \cong A \begin{bmatrix} | & | \\ & c_a^Y & \\ | & | \end{bmatrix} \quad (3)$$

$$\begin{bmatrix} | & | \\ \Delta\angle b^Y & \\ | & | \end{bmatrix} \cong A \begin{bmatrix} | & | \\ & c_p^Y & \\ | & | \end{bmatrix} \quad (4)$$

the meaning of formula 3 is that each element in the $$\begin{bmatrix} | & | \\ & c_a^Y & \\ | & | \end{bmatrix}$$

is the Y noise correlation coefficient between the eigenvalue noise on the Y polarization state and the coefficient amplitude noise on the Y polarization state when the mean square error between the left-hand side and right-hand side is minimized;

the meaning of formula 4 is that each element in the $$\begin{bmatrix} | & | \\ & c_p^Y & \\ | & | \end{bmatrix}$$

is the Y noise correlation coefficient between the eigenvalue noise on the Y polarization state and a coefficient phase noise on the Y polarization state when the mean square error between the left-hand side and right-hand side is minimized.

In an embodiment, in step S100, training signals are periodically inserted into the non-training signal, which helps to estimate the influence on the non-training signal by the optical fiber channel. The channel influence on non-training signal will be better estimated, and the noise will be removed as much as possible by the present application.

S200, obtaining an X non-training discrete spectral coefficient noise from an X non-training discrete spectral coefficient of the X polarization state and a Y non-training discrete spectral coefficient noise from a Y non-training discrete spectral coefficient of the Y polarization state based on a non-training eigenvalue noise of a non-training discrete spectral eigenvalue, the X noise correlation coefficient, and the Y noise correlation coefficient; the non-training discrete spectral eigenvalue, the X non-training discrete spectral coefficient, and the Y non-training discrete spectral coefficient are three properties of a non-training nonlinear frequency division multiplexing signal in the nonlinear frequency domain.

In the present embodiment, the non-training discrete spectral eigenvalue refers to a discrete spectral eigenvalue of a non-training nonlinear frequency division multiplexing signal in the nonlinear frequency domain, that is, the corresponding discrete spectral eigenvalue of the linear frequency division multiplexing signal in the nonlinear frequency domain transmitted by the transmitter in an actual communication process.

Step S100, from the training NFDM signal, obtains $$\begin{bmatrix} | \\ c_a^X \\ | \end{bmatrix}, \begin{bmatrix} | \\ c_p^X \\ | \end{bmatrix}, \begin{bmatrix} | \\ c_a^Y \\ | \end{bmatrix},$$

and $$\begin{bmatrix} | \\ c_p^Y \\ | \end{bmatrix}.$$

When the non-training NFDM signal is transmitted in the optical fiber, the four correlation coefficients stated above can be applied to denoising. Step S200 comprises step S201, step S202, and step S203 as follows:

S201, obtaining the X non-training eigenvalue noise on the X polarization state and the Y non-training eigenvalue noise on the Y polarization state in the non-training eigenvalue noise, according to the non-training eigenvalue noise $\Delta\lambda'$.

S202, multiplying the X non-training eigenvalue noise by the X noise correlation coefficient, and obtaining the X non-training discrete spectral coefficient noise.

The present embodiment, wherein the X non-training discrete spectral coefficient noise comprises an X non-training coefficient amplitude noise $\Delta|\tilde{b}|^X$ and an X non-training coefficient phase noise $\Delta\angle\tilde{b}^X$.

$$\Delta|\tilde{b}|^X \cong A' \begin{bmatrix} | \\ c_a^X \\ | \end{bmatrix}$$

$$\Delta\angle\tilde{b}^X = A' \begin{bmatrix} | \\ c_p^X \\ | \end{bmatrix}$$

$$A = \begin{bmatrix} | & | & | & | & | & | & | & | & | & | & | & | \\ \mathrm{Re}\Delta\lambda^X & \mathrm{Re}\Delta\lambda^{X+1} & \mathrm{Re}\Delta\lambda^{X-1} & \mathrm{Im}\Delta\lambda^X & \mathrm{Im}\Delta\lambda^{X+1} & \mathrm{Im}\Delta\lambda^{X-1} & \mathrm{Re}\Delta\lambda^Y & \mathrm{Re}\Delta\lambda^{Y+1} & \mathrm{Re}\Delta\lambda^{Y-1} & \mathrm{Im}\Delta\lambda^Y & \mathrm{Im}\Delta\lambda^{Y+1} & \mathrm{Im}\Delta\lambda^{Y-1} \\ | & | & | & | & | & | & | & | & | & | & | & | \end{bmatrix}$$

A' is obtained by substituting the $\Delta\lambda$ in A with $\Delta\lambda'$.

S203, multiplying the Y non-training eigenvalue noise by the Y noise correlation coefficient, and obtaining the Y non-training discrete spectral coefficient noise.

The present embodiment, wherein the Y non-training discrete spectral coefficient noise comprises a Y non-training coefficient amplitude noise $\Delta|\tilde{b}|^Y$ and a Y non-training coefficient phase noise $\Delta\angle\mathrm{b}^Y$.

$$\Delta|\tilde{b}|^Y = A' \begin{bmatrix} | \\ c_a^Y \\ | \end{bmatrix}$$

$$\Delta\angle\tilde{b}^Y = A' \begin{bmatrix} | \\ c_p^Y \\ | \end{bmatrix}$$

S300, obtaining the X non-training discrete spectral coefficient after denoising (i.e., noise compensation) and the Y non-training discrete spectral coefficient after denoising, according to the X non-training discrete spectral coefficient noise and the Y non-training discrete spectral coefficient noise as well as the X non-training discrete spectral coefficient and the Y non-training discrete spectral coefficient.

In the present embodiment, by subtracting the X non-training discrete spectral coefficient noise from the X non-training discrete spectral coefficient, the X non-training discrete spectral coefficient after the noise compensation $|\bar{b}|^X$ and $\angle \bar{b}^X$ are obtained.

The X non-training discrete spectral coefficient $b'^X$ comprises a non-training discrete spectral coefficient magnitude $|b'|^X$ and a non-training discrete spectral coefficient phase $\angle b'^X$.

$$|\bar{b}|^X = |b'|^X - \Delta|b|^X$$

$$\angle \bar{b}^X = \angle b'^X - \Delta \angle \tilde{b}^X$$

In the present embodiment,
by subtracting the Y non-training discrete spectral coefficient noise from the Y non-training discrete spectral coefficient, the Y non-training discrete spectral coefficient after the noise compensation $|\bar{b}|^Y$ and $\angle \bar{b}^Y$ are obtained.

The Y non-training discrete spectral coefficient $b'^Y$ comprises a non-training discrete spectral coefficient magnitude $|\bar{b}'|^Y$ and a non-training discrete spectral coefficient phase $\angle b'^Y$.

$$|\bar{b}|^Y = |b'|^Y - \Delta|\tilde{b}|^Y$$

$$\angle \bar{b}^Y = \angle b'^Y - \Delta \angle \tilde{b}^Y$$

Figure 3:
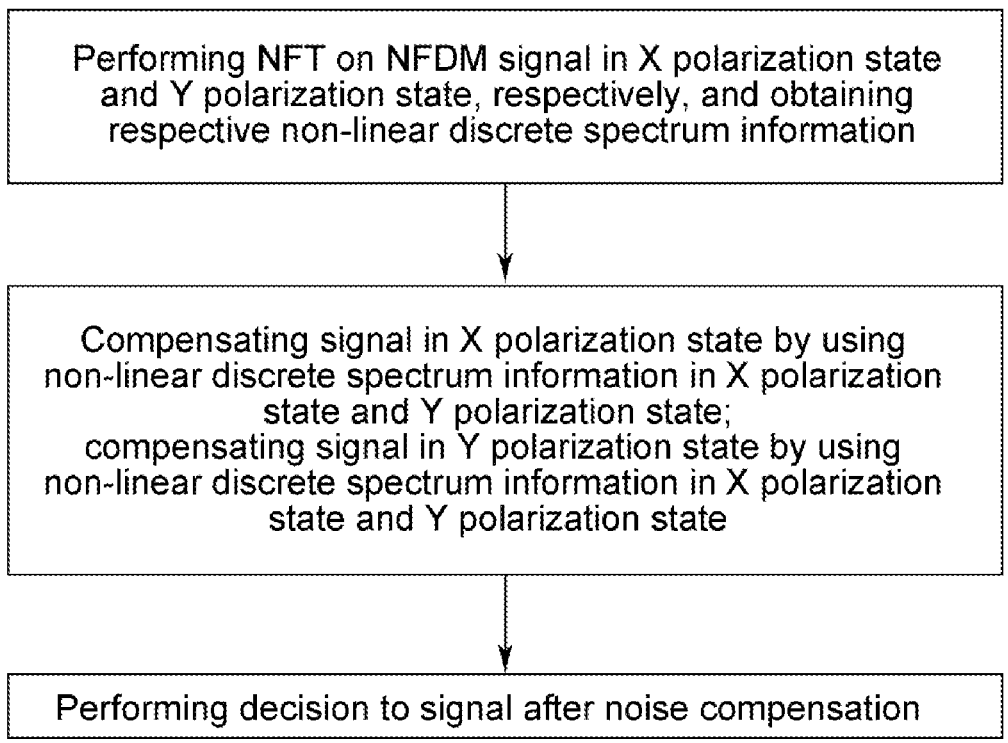
FIG. 3 is a flow chart on noise compensation in an embodiment of the present application.

The noise of $|\bar{b}|^X$, $\angle \bar{b}^X$, $|\bar{b}|^Y$ and $\angle \bar{b}^Y$ will be significantly reduced, as shown in FIG. 3, followed by performing decision to the signal after noise compensation. A signal in a non-linear frequency domain is also defined by a constellation diagram. "Decision" has the common meaning in the field of communication, which usually means assigning the signal to the nearest constellation point away from it.

Figure 4:
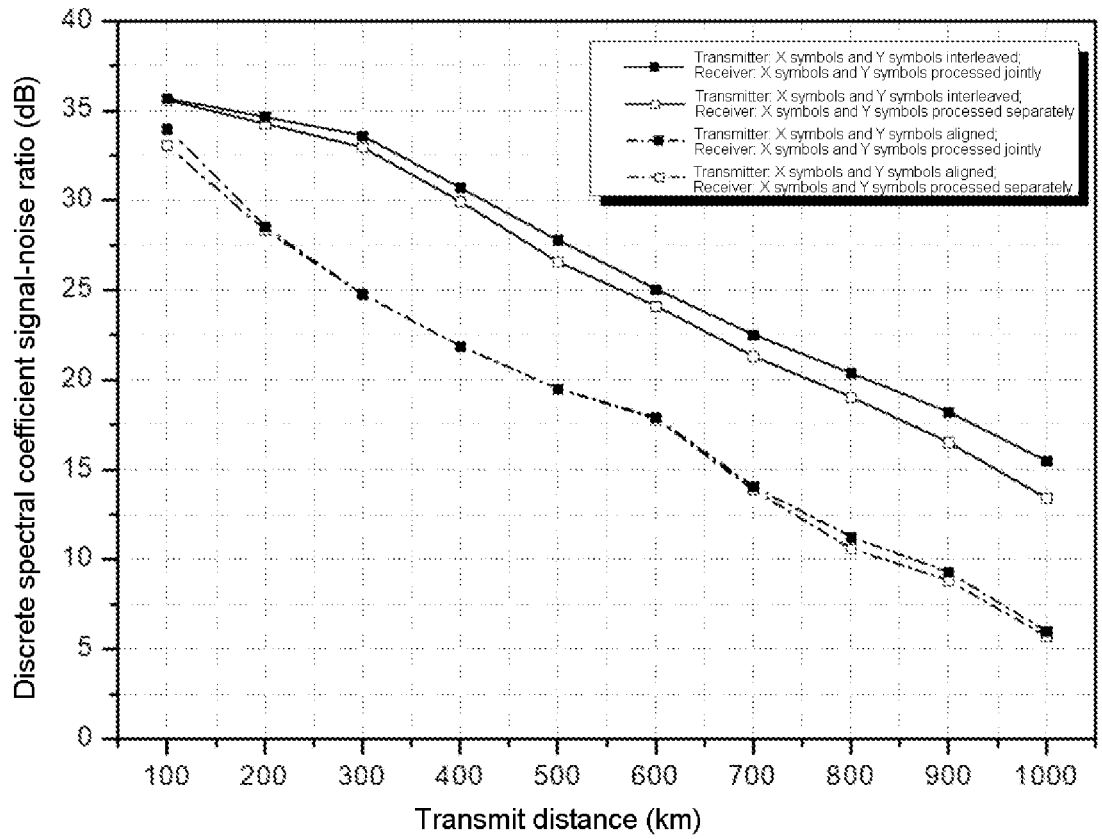
FIG. 4 is a simulation diagram in an embodiment of the present application.

In an embodiment, by simulating the noise compensation method in the present application, a simulation result as FIG. 4 is obtained, showing the noise compensation method of the present application has a great advantage. As shown in FIG. 4, the simulation is performed under four different conditions:

1. transmitter: X symbols and Y symbols interleaved, receiver: X symbols and Y symbols processed jointly;
2. transmitter: X symbols and Y symbols interleaved, receiver: X symbols and Y symbols processed separately;
3. transmitter: X symbols and Y symbols aligned, receiver: X symbols and Y symbols processed jointly;
4. transmitter: X symbols and Y symbols aligned, receiver: X symbols and Y symbols processed separately.

In summary, transmitting the nonlinear frequency division multiplexing signal in an optical fiber channel will generate noise, and the noise generated will change the discrete spectral eigenvalue and discrete spectral coefficient of the nonlinear frequency division multiplexing signal in the nonlinear frequency domain, that is, making both the discrete spectral eigenvalue and the discrete spectral coefficient carry with noise, and there is a correlation between the noise carried by both. Since the noise carried by the eigenvalue of the discrete spectrum is often known, thus it is possible to apply the noise carried by the eigenvalue of the discrete spectrum to calculate the noise contained in the discrete spectral coefficient. The present application compensates the discrete spectral coefficient noise on the X polarization state with noise information carried in the discrete spectral eigenvalue (an eigenvalue noise) and the X noise correlation coefficient between the discrete eigenvalue noise and the discrete spectral coefficient noise on the X polarization state, also compensates the discrete spectral coefficient noise on the Y polarization state with the noise information carried in the discrete spectral eigenvalue and the Y noise correlation coefficient between the discrete eigenvalue noise and the discrete spectral coefficient noise on the Y polarization state. Since when compensating the discrete spectral coefficient noise on the X polarization state and the Y polarization state, the present application makes use of the eigenvalue noise on the X polarization state and the Y polarization state simultaneously, thus it realizes the compensation of the discrete spectral coefficient noise on the X polarization state and the Y polarization state more effectively, that is, improves the quality of the signal carried by the discrete spectral coefficient.

In addition, the present application carries out a signal interleaving design for the polarization division multiplexed NDFM signal at the transmitter, and carries out a dual-polarization-joint signal processing and noise compensation at the receiver, so as to improve overall signal quality.

An Embodiment of the Device

The present embodiment further provides a noise processing device for the signal based on the dual-polarization combination, wherein the device comprises following components:

a noise correlation coefficient calculation module, configured to calculate the X noise correlation coefficient on the X polarization state and the Y noise correlation coefficient on the Y polarization state respectively, the X noise correlation coefficient is configured to characterize the correlation between the training eigenvalue noise of the training discrete spectral eigenvalue and the X training discrete spectral coefficient noise of the X training discrete spectral coefficient on the X polarization state; the Y noise correlation coefficient is configured to characterize the correlation between the training eigenvalue noise and the Y training discrete spectral coefficient noise of the Y training discrete spectral coefficient on the Y polarization state; the training discrete spectral eigenvalue and the training discrete spectral coefficient are two properties of the training nonlinear frequency division multiplexing signal in the nonlinear frequency domain; the X polarization state and the Y polarization state are the two polarization states of the training nonlinear frequency division multiplexing signal in the time domain;

a noise calculation module, configured to obtain the X non-training discrete spectral coefficient noise contained in the X non-training discrete spectral coefficient on the X polarization state and the Y non-training discrete spectral coefficient noise contained in the Y non-training discrete spectral coefficient on the Y polarization state based on the non-training eigenvalue noise of the non-training discrete spectral eigenvalue, the X noise correlation coefficient, and the Y noise correlation coefficient; the non-training discrete spectral eigenvalue, the X non-training discrete spectral coefficient, and the Y non-training discrete spectral coefficient are three properties of the non-training nonlinear frequency division multiplexing signal in the nonlinear frequency domain;

a noise compensation module, configured to obtain the X non-training discrete spectral coefficient after the noise compensation and the Y non-training discrete spectral coefficient after the noise compensation, according to the X non-training discrete spectral coefficient noise and the Y non-training discrete spectral coefficient noise as well as the X non-training discrete spectral coefficient and the Y non-training discrete spectral coefficient; the noise compensation is configured to characterize the denoising information.

Figure 5:
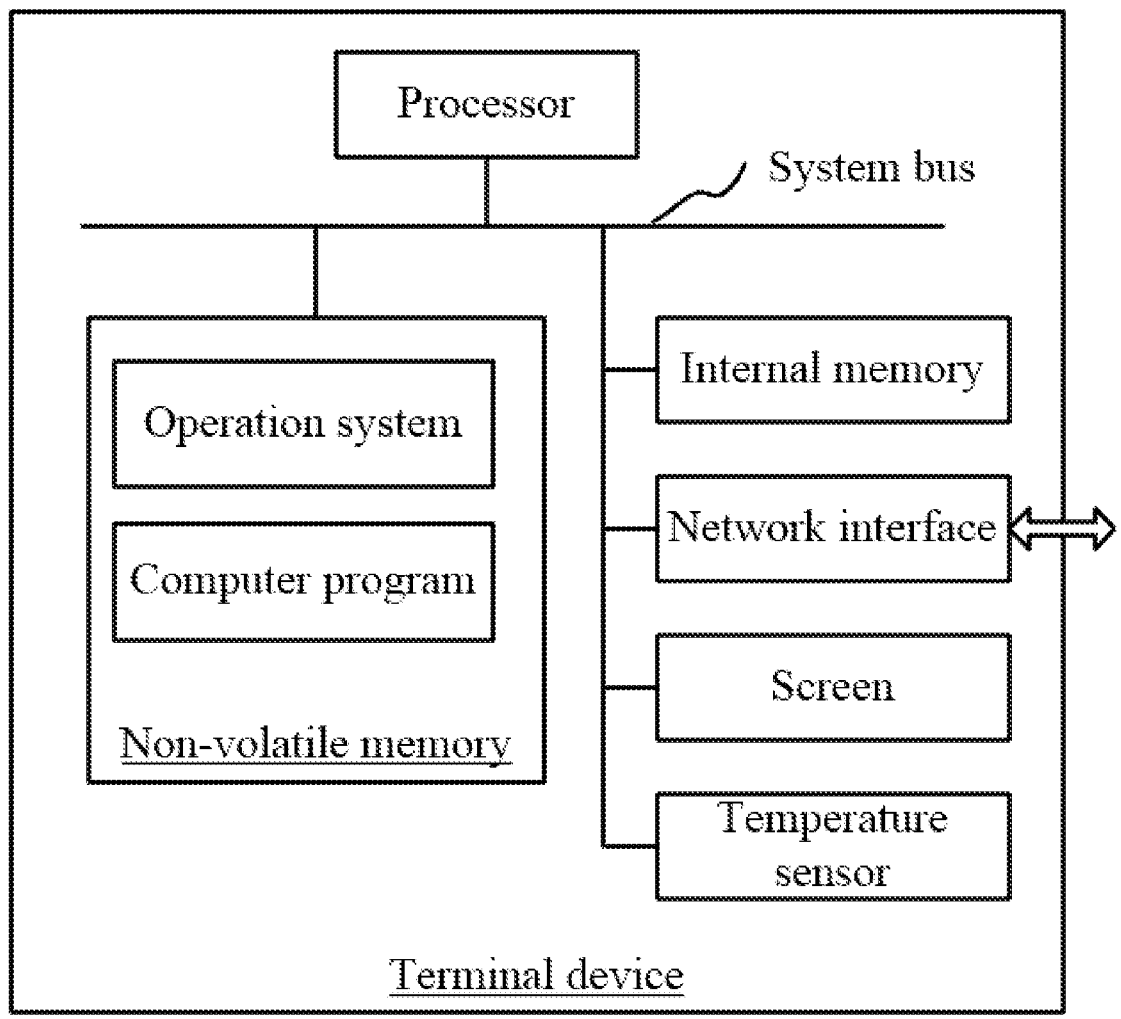
FIG. 5 is a schematic diagram of the internal structure of a terminal device provided by an embodiment of the present application.

Based on the embodiment stated above, the present application further provides a terminal device, a principle block diagram thereof is shown as FIG. 5. The terminal device comprises a processor, a storage, a network interface, a screen and a temperature sensor connected by a system bus. Wherein, the processor of the terminal device is configured to provide a computing and control capability. The memory of the terminal device comprises a non-volatile storage medium and an internal memory. The non-volatile storage medium has an operating system and a computer program stored. The internal memory provides an environment for running the operating system and the computer program stored in the non-volatile storage medium. The network interface of the terminal device is configured to communicate with a plurality of external terminals through a network connection. When the computer program is executed by the processor, it is possible to achieve a noise processing method for signal based on dual-polarization combination. The screen of the terminal device may be an LCD or an E-ink screen. The temperature sensor of the terminal device is arranged inside the terminal device in advance, configured to detect an operating temperature of a plurality of internal devices.

A common technical person in the present field can understand that, the principle block diagram shown in FIG. 5 is a block diagram only for a part structure related to the present application, instead of constituting a limitation of the terminal devices to which the solution of the present application is applied. A specific terminal device may comprise more or fewer components than shown in the figure, or combine some components, or have a different component arrangement.

In an embodiment, the present application provides a terminal device, wherein the terminal device comprises a computer-readable storage medium, a processor, and a dual-polarization-joint noise processing program stored in the storage and being able to be run by the processor, when the processor runs the dual-polarization-joint noise processing program, following operation instructions are achieved:

calculating the X noise correlation coefficient on X polarization state and the Y noise correlation coefficient on Y polarization state respectively, the X noise correlation coefficient is configured to characterize a correlation between the training eigenvalue noise of training discrete spectral eigenvalue and the X training discrete spectral coefficient noise of X training discrete spectral coefficient on X polarization state; the Y noise correlation coefficient is configured to characterize the correlation between the training eigenvalue noise and the Y training discrete spectral coefficient noise of Y training discrete spectral coefficient on Y polarization state; the training discrete spectral eigenvalue and the training discrete spectral coefficient are two properties of a training nonlinear frequency division multiplexing signal in the nonlinear frequency domain; the X polarization state and the Y polarization state are two polarization states of a training nonlinear frequency division multiplexing signal in the time domain;

obtaining an X non-training discrete spectral coefficient noise contained in an X non-training discrete spectral coefficient on the X polarization state and a Y non-training discrete spectral coefficient noise contained in a Y non-training discrete spectral coefficient on the Y polarization state based on a non-training eigenvalue noise of a non-training discrete spectral eigenvalue, the X noise correlation coefficient, and the Y noise correlation coefficient; the non-training discrete spectral eigenvalue, the X non-training discrete spectral coefficient, and the Y non-training discrete spectral coefficient are three properties of a non-training nonlinear frequency division multiplexing signal in the nonlinear frequency domain;

obtaining an X non-training discrete spectral coefficient after a noise compensation and a Y non-training discrete spectral coefficient after the noise compensation, according to the X non-training discrete spectral coefficient noise and the Y non-training discrete spectral coefficient noise as well as the X non-training discrete spectral coefficient and the Y non-training discrete spectral coefficient; the noise compensation is configured to characterize denoising information.

Those skilled in the art can understand that a whole or a part of the processes in the methods of the embodiments stated above can be accomplished by a computer program instructing a plurality of relevant hardware. The computer program can be stored in a nonvolatile computer-readable storage medium, when the computer program is executed, the processes in the embodiments of the above methods may be included. Wherein any references to the memory, storage, database or other media used in the embodiments provided by the present application may comprise a non-volatile memory and/or a volatile memory. The non-volatile memory may comprise a read-only memory (ROM), a programmable ROM (PROM), an electrically programmable ROM (EPROM), an electrically erasable programmable ROM (EEPROM), or a flash memory. The volatile memory may comprise a random access memory (RAM) or an external cache memory. As an illustration instead of a limitation, the RAM is available in a plurality of forms, including a static RAM (SRAM), a dynamic RAM (DRAM), a synchronous DRAM (SDRAM), a dual data rate SDRAM (DDRS-DRAM), an enhanced SDRAM (ESDRAM), a synchronous link (Synchlink), a DRAM (SLDRAM), a memory bus (Rambus), a direct RAM (RDRAM), a direct memory bus dynamic RAM (DRDRAM), a memory bus dynamic RAM (RDRAM), and more.

It should be understood that, the application of the present application Is not limited to the above examples listed. Ordinary technical personnel in this field can improve or change the applications according to the above descriptions, all of these improvements and transforms should belong to the scope of protection in the appended claims of the present application.

What is claimed is:

1. A dual-polarization-joint noise processing method, wherein comprising:

calculating an X noise correlation coefficient on an X polarization state of linear polarization in a horizontal direction and a Y noise correlation coefficient on a Y polarization state of linear polarization in a vertical direction respectively, the X noise correlation coefficient is configured to characterize a correlation between a training eigenvalue noise of a training discrete spectral eigenvalue and an X training discrete spectral coefficient noise of an X training discrete spectral coefficient on the X polarization state; the Y noise correlation coefficient is configured to characterize a correlation between the training eigenvalue noise and a Y training discrete spectral coefficient noise of a Y training discrete spectral coefficient on the Y polarization state; the training discrete spectral eigenvalue and the training discrete spectral coefficient are two properties of a training nonlinear frequency division multiplexing signal in a nonlinear frequency domain; the X polarization state and the Y polarization state are two polarization states of the training nonlinear frequency division multiplexing signal in a time domain;

obtaining an X non-training discrete spectral coefficient noise from an X non-training discrete spectral coefficient of the X polarization state and a Y non-training discrete spectral coefficient noise from a Y non-training discrete spectral coefficient of the Y polarization state based on a non-training eigenvalue noise of a non-training discrete spectral eigenvalue, the X noise correlation coefficient, and the Y noise correlation coefficient; the non-training discrete spectral eigenvalue, the X non-training discrete spectral coefficient, and the Y non-training discrete spectral coefficient are three properties of a non-training nonlinear frequency division multiplexing signal in the nonlinear frequency domain;

obtaining an X non-training discrete spectral coefficient after a noise compensation and a Y non-training discrete spectral coefficient after the noise compensation according to the X non-training discrete spectral coefficient noise, the Y non-training discrete spectral coefficient noise, the X non-training discrete spectral coefficient, and the Y non-training discrete spectral coefficient; the noise compensation is configured to characterize denoising information.

2. The noise processing method according to claim 1, wherein calculating the X noise correlation coefficient on the X polarization state and the Y noise correlation coefficient on the Y polarization state respectively, the X noise correlation coefficient is configured to characterize the correlation between the training eigenvalue noise of the training discrete spectral eigenvalue and the X training discrete spectral coefficient noise of the X training discrete spectral coefficient on the X polarization state; the Y noise correlation coefficient is configured to characterize a correlation between the training eigenvalue noise and a Y training discrete spectral coefficient noise of a Y training discrete spectral coefficient on the Y polarization state; the training discrete spectral eigenvalue and the training discrete spectral coefficient are two properties of the training nonlinear frequency division multiplexing signal in the nonlinear frequency domain; the X polarization state and the Y polarization state are two polarization states of the training nonlinear frequency division multiplexing signal in the time domain, comprising:

obtaining an X training eigenvalue noise and a Y training eigenvalue noise in the training eigenvalue noises according to the training eigenvalue noise; the X training eigenvalue noise is configured to characterize a noise contained in the training discrete spectral eigenvalue located on the X polarization state; the Y training eigenvalue noise is configured to characterize a noise contained in the training discrete spectral eigenvalue located on the Y polarization state;

circularly shifting the X training eigenvalue noise and the Y training eigenvalue noise by K positions respectively, where K is an integer, and obtaining the X training eigenvalue noise and the Y training eigenvalue noise after the shift respectively;

constructing a training noise matrix according to an arrangement order of the X training eigenvalue noise, the X training eigenvalue noise after the shift, the Y training eigenvalue noise, and the Y training eigenvalue noise after the shift;

obtaining the X noise correlation coefficient and the Y noise correlation coefficient according to the training noise matrix, the X training discrete spectral coefficient noise, and the Y training discrete spectral coefficient noise.

3. The noise processing method according to claim 2, wherein obtaining the X noise correlation coefficient and the Y noise correlation coefficient according to the training noise matrix, the X training discrete spectral coefficient noise, and the Y training discrete spectral coefficient noise, comprising:

obtaining an "X multiplication" vector by multiplying the training noise matrix by an X setting parameter matrix; the X setting parameter matrices comprise the X noise correlation coefficients;

determining the X setting parameter matrices such that the mean square error between the X training discrete spectral coefficient noise and the "X multiplication" vector is minimized;

obtaining the X noise correlation coefficient according to a value of each element in the X setting parameter matrices;

obtaining a "Y multiplication" vector by multiplying the training noise matrix by a Y setting parameter matrix; the Y setting parameter matrices comprise the Y noise correlation coefficients;

determining the Y setting parameter matrices such that the mean square error between the Y training discrete spectral coefficient noise and the "Y multiplication" vector is minimized;

obtaining the Y noise correlation coefficient according to a value of each element in the Y setting parameter matrices.

4. The noise processing method according to claim 1, wherein obtaining the X non-training discrete spectral coefficient noise contained in the X non-training discrete spectral coefficient on the X polarization state and the Y non-training discrete spectral coefficient noise contained in the Y non-training discrete spectral coefficient on the Y polarization state according to the non-training eigenvalue noise of the non-training discrete spectral eigenvalue, the X noise correlation coefficient, and the Y noise correlation coefficient, comprising:

obtaining the X non-training eigenvalue noise on the X polarization state and the Y non-training eigenvalue noise on the Y polarization state in the non-training eigenvalue noise according to the non-training eigenvalue noise;

multiplying the X non-training eigenvalue noise by the X noise correlation coefficient, and obtaining the X non-training discrete spectral coefficient noise;

multiplying the Y non-training eigenvalue noise by the Y noise correlation coefficient, and obtaining the Y non-training discrete spectral coefficient noise.

5. The noise processing method according to claim 1, wherein obtaining the X non-training discrete spectral coefficient after the noise compensation and the Y non-training discrete spectral coefficient after the noise compensation according to the X non-training discrete spectral coefficient noise, the Y non-training discrete spectral coefficient noise, the X non-training discrete spectral coefficient, and the Y non-training discrete spectral coefficient; the noise compensation is configured to characterize the denoising information, comprising:

subtracting the X non-training discrete spectral coefficient noise from the X non-training discrete spectral coefficient, and obtaining the X non-training discrete spectral coefficient after the noise compensation;

subtracting the Y non-training discrete spectral coefficient noise from the Y non-training discrete spectral coefficient, and obtaining the Y non-training discrete spectral coefficient after the noise compensation.

6. The noise processing method according to claim 1, wherein the nonlinear frequency division multiplexing signal in the nonlinear frequency domain is a nonlinear frequency division multiplexing signal in the nonlinear frequency domain at a receiver, and a generation method of the nonlinear frequency division multiplexing signal in the nonlinear frequency domain at the receiver comprising:

controlling a transmitter to generate two streams of the nonlinear frequency division multiplexing signal in the nonlinear frequency domain;

controlling the transmitter to perform an inverse nonlinear Fourier transform on the two streams of the nonlinear frequency division multiplexing signal in the nonlinear frequency domain, and obtaining two streams of nonlinear frequency division multiplexing signal in the time domain;

controlling the transmitter to load respectively the two streams of the nonlinear frequency division multiplexing signal in the time domain to the X polarization state and the Y polarization state of an optical signal modulator, and obtaining the nonlinear frequency division multiplexing signal in the time domain on the X polarization state and the nonlinear frequency division multiplexing signal in the time domain on the Y polarization state;

controlling the transmitter to transmit the nonlinear frequency division multiplexing signal in the time domain on the X polarization state and the nonlinear frequency division multiplexing signal in the time domain on the Y polarization state along an optical fiber to the receiver, configured to generate the nonlinear frequency division multiplexing signal in the nonlinear frequency domain at the receiver.

7. The noise processing method according to claim 6, wherein the controlling the transmitter to transmit the nonlinear frequency division multiplexing signal in the time domain on the X polarization state and the nonlinear frequency division multiplexing signal in the time domain on the Y polarization state along an optical fiber to the receiver, configured to generate the nonlinear frequency division multiplexing signal in the nonlinear frequency domain at the receiver, comprising:

controlling the transmitter to transmit the nonlinear frequency division multiplexing signal in the time domain on the X polarization state and the nonlinear frequency division multiplexing signal in the time domain on the Y polarization state alternately to the receiver along the optical fiber, a symbol number of the nonlinear frequency division multiplexing signal in the time domain on the X polarization state is equal to a symbol number of the nonlinear frequency division multiplexing signal in the time domain on the Y polarization state.

8. A dual-polarization-joint noise processing device, wherein the device comprising:
a processor programmed to function as:
a noise correlation coefficient calculation module, configured to calculate an X noise correlation coefficient on an X polarization state of linear polarization in a horizontal direction and a Y noise correlation coefficient on a Y polarization state of linear polarization in a vertical direction respectively; the X noise correlation coefficient is configured to characterize a correlation between a training eigenvalue noise of a training discrete spectral eigenvalue and an X training discrete spectral coefficient noise of an X training discrete spectral coefficient on the X polarization state; the Y noise correlation coefficient is configured to characterize a correlation between the training eigenvalue noise and a Y training discrete spectral coefficient noise of a Y training discrete spectral coefficient on the Y polarization state; the training discrete spectral eigenvalue and the training discrete spectral coefficient are two properties of a training nonlinear frequency division multiplexing signal in the nonlinear frequency domain; the X polarization state and the Y polarization state are two polarization states of the training nonlinear frequency division multiplexing signal in the time domain;

a noise calculation module, configured to obtain an X non-training discrete spectral coefficient noise from an X non-training discrete spectral coefficient of the X polarization state and a Y non-training discrete spectral coefficient noise from a Y non-training discrete spectral coefficient of the Y polarization state based on a non-training eigenvalue noise of a non-training discrete spectral eigenvalue, the X noise correlation coefficient, and the Y noise correlation coefficient; the non-training discrete spectral eigenvalue, the X non-training discrete spectral coefficient, and the Y non-training discrete spectral coefficient are three properties of a non-training nonlinear frequency division multiplexing signal in the nonlinear frequency domain;

a noise compensation module, configured to obtain an X non-training discrete spectral coefficient after a noise compensation and a Y non-training discrete spectral coefficient after the noise compensation according to the X non-training discrete spectral coefficient noise, the Y non-training discrete spectral coefficient noise, the X non-training discrete spectral coefficient, and the Y non-training discrete spectral coefficient; the noise compensation is configured to characterize the denoising information.

9. A terminal device, wherein the terminal device comprises a non-transitory computer-readable storage medium, a processor, and a dual-polarization-joint noise processing program stored in the computer-readable storage medium, the dual-polarization-joint noise processing program is able to be run by the processor, when the processor runs the dual-polarization-joint noise processing program, the steps of the noise processing method according to claim 1 are achieved.

* * * * *